AIR HEATING BURNERS

Original Filed Nov. 24, 1964 6 Sheets-Sheet 1

INVENTOR.
LYLE S. SPIELMAN
BY Herman Helbach
ATTORNEY

AIR HEATING BURNERS

Original Filed Nov. 24, 1964 6 Sheets-Sheet 3

INVENTOR.
LYLE S. SPIELMAN
BY Herman Hulak
ATTORNEY

INVENTOR.
LYLE S. SPIELMAN
Norman H. Gerlach
ATTORNEY

INVENTOR.
LYLE S. SPIELMAN
Herman Berlach
ATTORNEY

AIR HEATING BURNERS

Original Filed Nov. 24, 1964 6 Sheets-Sheet 5

INVENTOR.
LYLE S. SPIELMAN
BY Norman Geelach
ATTORNEY

INVENTOR.
LYLE S. SPIELMAN
BY Norman Hebert
ATTORNEY

United States Patent Office

Re. 26,244
Reissued Aug. 1, 1967

26,244
AIR HEATING BURNERS

Lyle S. Spielman, Rockford, Ill., assignor to Eclipse Fuel Engineering Co., Rockford, Ill., a corporation of Illinois Original No. 3,265,376, dated Aug. 9, 1966, Ser. No. 413,414, Nov. 24, 1964. Application for reissue Oct. 24, 1966, Ser. No. 597,179
20 Claims. (Cl. 263—19)

Matter enclosed in heavy brackets [ ] appears in the original patent but forms no part of this reissue specification; matter printed in italics indicates the additions made by reissue.

*ABSTRACT OF THE DISCLOSURE*

*A gas mixing burner adapted for operation in an air stream flowing forwardly past it, comprising (a) a tubular burner body having a forward burner face directed downstream and provided with a multiplicity of spaced relatively small burner ports therein in communication with the interior of the body for producing a corresponding number of forwardly directed flame jets; (b) flame-confining walls extending forwardly from the forward burner face of the burner body, defining, in combination with said burner face, a forwardly opening combustion trough, and having formed therein a plurality of openings spaced both longitudinally and at different distances from the burner face, (c) means including the flame-confining walls defining a pair of air supply chambers on opposite sides of the combustion trough, and (d) means for regulably supplying fuel-gas under pressure to the interior of the tubular burner body, and having the air supply chambers in communication with and adapted to receive air from a supply of air under such pressure as to cause the air in the air supply chambers to flow through the openings in the flame-confining walls into the combustion trough.*

The improved burner embodying the present invention has been designed for use primarily, but not necessarily, as an air heating burner and, when so used, [it] is adapted to be positioned bodily in or adjacent to a stream of air [under pressure] *or other fluid* for the purpose of heating the air *or other fluid* which flows past it. Burners of this particular type are commonly referred to as air stream burners. The invention is specifically concerned with an air heating gas burner which is capable of intimately mixing fuel gas or a mixture of fuel gas and air with additional air to effect complete combustion and simultaneously discharging the heated products of combustion into the passing [air] stream for the purpose of heating the latter.

Still more specifically, and with reference to the physical aspects of the present air stream burner, the burner may be made up in a variety of sections including straight sections, T's and crosses, thus making it possible easily to assume a burner having a given desired configuration which will fit into various shapes and sizes of air spaces. Sectional air stream burners of this general type since they are, in the main, made up of straight line burner sections, are frequently referred to as line burners.

Most present-day line-type air stream burners, when interposted in an air stream under pressure have a limited capacity range. Inasmuch as in a burner of this type, the flame must be maintained within the path of [an] *a moving* air stream [moving at a relatively high velocity], it is necessary that the burner be of the premix type wherein the fuel which is fed thereto to support combustion [in] *is* a combustible gaseous mixture, usually consisting of gas and air which have been thoroughly premixed prior to conduction thereof to the burner. Thus, upon release of the gaseous mixture into the moving air stream, no difficulty will be encountered in igniting the mixture. [An air stream burner of the type under consideration requires for efficient combustion a gas-air ratio of approximately ten to one and this ratio must be maintained over a wide range of operation of the burner in order to maintain stable and complete combustion with a reasonably short flame. Such a] *The* mixture must be supplied at *such* a sufficiently high pressure that backfiring into the burner is precluded. Since an air stream burner invariably calls for large quantities of fuel to heat the air passing the burner, large port areas are usually maintained to accommodate high fire conditions. With such large port areas and *a* high [gas-air ratios] *air-gas ratio* in effect, the flame that is produced under high fire conditions may be unduly long. The presence of a long flame within the air stream on the downstream side of the burner is not conducive to complete combustion and the tip end of the flame is frequently quenched with the result that not all of the gas is consumed and undesirable aldehydes and carbon monoxide may be formed and released into the air stream. If the air undergoing heating is make-up air which ultimately is to be employed for supplementing normal space heating facilities in a building, for example, the presence of these undesirable aldehydes or carbon monoxide is, obviously, hazardous.

Another limitation that is attendant upon the construction and use of present-day air stream burners, whether of the line type or otherwise, is lack of a sufficiently large turndown range which is required for many installations. Where make-up air installations are concerned, the need for a high turndown ratio is apparent inasmuch as, in order to avoid discomfort to the personnel within a building, any replacement of make-up air that is supplied to the building must be heated to a very closely controlled temperature so that this air will be introduced into the building interior at approximately the temperature of the existing air or slightly thereabove. If the outside air is far below the temperature of the building interior, high heat input must be maintained at the burner. If the outside air is only a few degrees below room temperature, then, of course, low heat input must prevail at the burner. It has been found that a 25 to 1 turndown range will accommodate most make-up air installations, even in localities where extremely low ambient temperatures prevail.

Many of the limitations that are attendant upon the use of air stream burners for supplying make-up air for ventilating and similar purposes to supplement the usual space heating facilities are also present when air stream burners are employed for supplying heat to industrial ovens, such as drying kilns, curing ovens, heat tempering ovens and the like. In industrial oven installations of this type, it is customary to recirculate hot air and products of combustion through the oven or processing chamber, adding heat to the recirculating stream to maintain the desired oven temperature. In order to rid the atmosphere of the oven of accumulated gases as excess carbon dioxide, water vapor and the like resulting from the particular process being conducted, a portion of the oven atmosphere is exhausted and replaced by heated fresh air. In the interests of economy, however, only a portion of the oven atmosphere is exhausted and the remaining portion thereof is used in the recirculating stream. The fresh air which is added to the air stream to make up for the loss must then be heated by means of an air stream burner which frequently is of the line burner type. Since the recirculated portion of the air stream may contain an appreciable quantity of noncombustible gases, such as carbon dioxide, nitrogen, water vapor and the like resulting from the oven process, with only limited quantities of added fresh air, the air stream may lack sufficient oxygen to support proper combustion. With an air stream which is deficient in oxygen, the danger of partial combustion is increased.

The present invention is designed to overcome the above-noted limitations that are attendant upon the construction and use of present-day air stream burners, particularly burners of the line type and, accordingly, there is contemplated the provision of a novel burner which is of the nozzle-mixing type and is not dependent upon the quantity or quality of the air stream within which it is disposed or upon the velocity of the air stream for the attainment of [stoichiometric conditions] *good or clean combustion.* The invention further contemplates the provision of a novel burner having associated therewith means for effectively breaking up the steady flow of gas or gaseous constituents issuing from the burner ports in the combustion area of the burner and making available in this area a supply of fresh air, the supply being *for the most part* constant and continuous and always being maintained in excess of the amount of air which may be needed for combustion purposes. Even under high fire conditions, the air being supplied for intermingling with the gas issuing from the burner gas ports will combine with the gas in such a manner that it will effect complete combustion automatically, whether the flow of gas from the gas ports is high or low. At high fire conditions where the rate of flow of the gas from the burner ports is relatively large, much of the air may be consumed by the combustion process, while at low fire conditions, only a small amount of the air will be consumed with much excess air flowing in the combustion chamber of the burner and issuing from such combustion chamber for [comingling] *commingling* with the air stream as excess air.

Briefly, in carrying out the invention, the improved burner is made up of a number of line burner elements or units which form a pattern that is distributed preferably, but not necessarily, transversely across the area of the air stream within which the burner is placed. The heating flame occurs at a substantially continuous line along the length of each burner unit and the burner as a whole distributed this flame in the desired pattern across or within the air stream. Various shapes of line burner units may be provided to establish different burner configurations and among the contemplated shapes are elongated straight line units, T's and crosses. The castings which comprise these units are hollow and each casting provides an internal gas passageway. The various castings have end flanges which are bolted together to produce the desired burner configuration or pattern and, when so bolted, the passageways communicate with one another to establish a single composite gas passage. Gas may be introduced into the composite gas passage at any point. In many instances, it will be introduced into a terminal casting at the outer end thereof but it may also, if desired, be introduced into a casting which is more or less centrally disposed in the burner at a whole. Thus, certain castings may be manufactured with provision for such central introduction of gas, while other castings rely for their communication with adjacent castings for their supply of gas. End plates, certain of which have facilities for gas connection, and others of which have no such provision, are provided for selective use in connection with the castings for either introducing gas into the castings at the ends thereof or for closing such ends. When these end plates are in their operative position with respect to the burner as a whole, an internal gas chamber results from all of the intercommunicating passageways. Each burner casting is provided with a wall which is formed with a series of small closely spaced holes therein. Such holes are arranged in a row so that they extend longitudinally along a straight line burner casting and along the various legs of a T casting or a cross casting. The remainder of the burner as a whole is in the form of a burner shroud which is preferably, but not necessarily, of sheet metal construction, there being sheet metal or other counterparts for each type of burner casting. In the interests of economy when sheet metal is employed, certain of the sheet metal parts are common to two or more burner castings but, in general, the various sheet metal parts of the burner as a whole, whether the burner consists of a single casting or a plurality of castings, involves the establishment of two or more air supply chambers, variously arranged for different installations but so disposed that a wall portion of one chamber opposes a wall portion of another chamber on opposite sides of each straight line section of the burner, whether such straight line section be complete in itself or whether it be merely a leg of a T section or of a cross section. Provision is made for supplying each air chamber with air, the air being supplied by means of an air manifold or windbox which is located at the rear of the burner and is common to and in communication with all of the air supply chambers. The windbox is formed of sheet metal, as are the air supply chamber parts, adjoining sheet metal sections, strips and the like, being secured together by sheet metal screws or nut and bolt assemblies as desired. The burner ports open between the opposed air supply chambers and the two opposed faces of the chambers constitute flame-confining walls which establish therebetween a trough-like combustion space which preferably is narrow at its inner region in the viciinty of the burner ports and increases in width outwardly away from the ports. A multiplicity of air openings are formed in these opposed faces or walls so that air is admitted to the combustion trough at regions both near and far from the burner ports and at regions which collectively are coextensive with the burners as a whole. Means are provided for automatically bleeding a very small quantity of air from the burner air manifold to the burner gas supply exteriorly of the burner at a complete turndown ratio where a minimum amount of gas is fed to the burner and it is desired to maintain combustion of gas in the immediate vicinity of the individual gas ports, i.e., at the bottom of the combustion trough.

For progressively higher burner operation, only the fuel gas is increased and, as the supply rate of gas increases, a flame is supplied from all of the gas ports and progressively filling the bottom regions of the trough where it encounters the adjacent air openings in the trough side walls. These initial low fire conditions are accompanied by low velocity gas movements, but further increases in the supply rate of gas causes the unburned gas which fills the bottom regions of the trough to encounter an increased number of the air openings in the side walls of the trough so that turbulence increases and the flame begins to fill the trough. Excess air is always present at the outermost air openings to complete combustion of the last trace of unburned gas in the trough, but in the event that any unburned gas may reach the outermost portions of the trough and pass into the air stream beyond the rim of the trough, additional air openings are provided in the remote forward walls of the two air chambers for immediate union with such escaped gas so that it is not necessary to rely upon the oxygen in the air stream to effect the union. In this manner, the danger of extinguishing the flame by reason of a lack of oxygen in the air stream within which the burner is disposed, is avoided.

Despite the continuous and steady supply of air to the burner, the burner is self-regulating, which is to say, that the burner will operate efficiently despite a considerable variation in the fuel-[gas] *air* ratio, the ratio being varied simply by regulating the amount of gas that is supplied to the burner gas ports. The character of the air stream within which the burner is disposed has no appreciable effect upon the operation of the burner and the burner will operate as efficiently in an air stream of high oxygen content as in a stream which is seriously deficient in oxygen. By reason of such self-compensating burner operation, the burner may be abruptly or gradually throttled over a wide range of operating capacities that are not possible with conventional air stream burners.

The use of sectional units, each of which is comprised of but a single and relatively simple casting, together with various counterpart sheet metal adjuncts to form the windbox and air supply chambers, results in a burner which is not costly from a manufacturing point of view and may be erected empirically at any given scene of installation to accommodate space and shape requirements.

The provision of a burner of the character briefly outlined above being the principal object of the invention, numerous other objects and advantages will become readily apparent as the nature of the invention is better understood.

In the accompanying six sheets of drawings forming a part of this specification, several representative burner units capable of being assembled in various ways to produce different burner installations or assemblies according to the present invention have been illustrated. Specifically, burner units representing straight-line sections and crosses have been shown and the manner in which they may be connected together has also been indicated. Other sectional units, such as T's, have not been illustrated, but it is believed that their construction and manner of union in an operative burner assembly will be obvious from the following description of the illustrated forms of burner sections or units.

Figure 1:
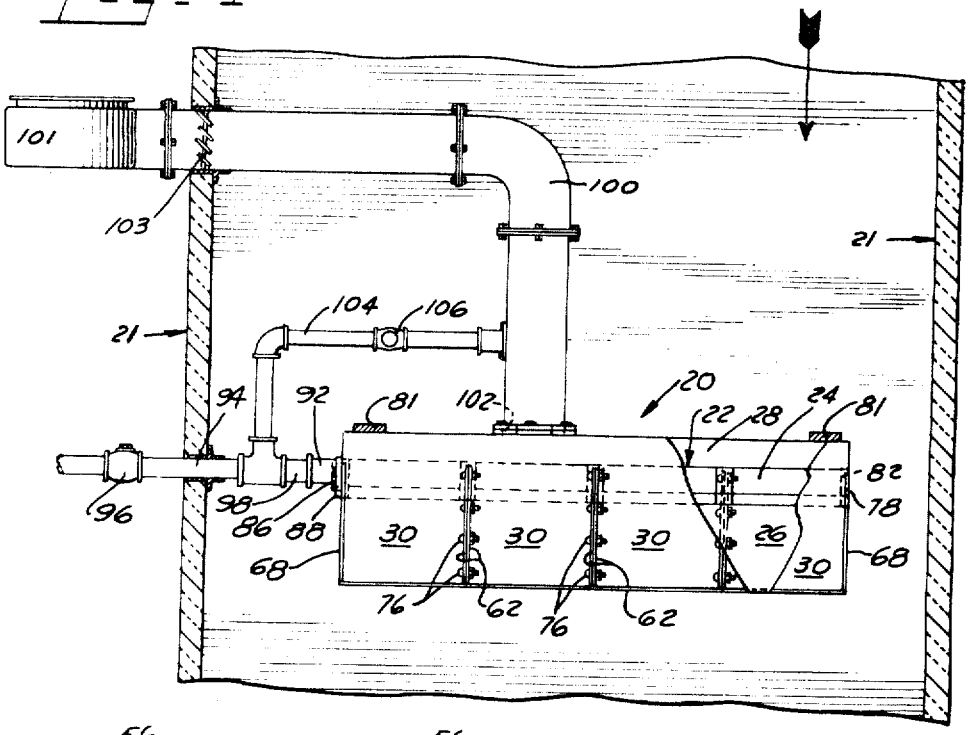
FIG. 1 is a top plan view of a composite sectional burner constructed according to the present invention and showing the same operatively installed in an air stream, the conduit for the air stream being shown in horizontal section and the burner sections being of the straight-line type.

Referring now to the drawings in detail and in particular to FIG. 1, an assembled sectional gas burner 20 is shown as being arranged transversely in a moving air stream (indicated by the arrow), the air stream being confined in a duct 21. The air stream may be either a fresh air stream or it may be a recirculating air stream. In the former instance, the duct 21 may be operatively connected to a suitable inlet grille (not shown), while in the latter instance, the duct 21 may constitute a portion of the recirculating duct work of an industrial oven or the like. The air stream may be impelled under pressure through the duct 21 by means of a suitable motor-driven blower (not shown). The burner 20 may be positioned on either the suction or the pressure side of the blower and comprises a burner proper 22 which, in the form of the burner that is shown in FIG. 1, is made up of a plurality of individual burner bodies in the form of castings 24. The latter are bolted together in a manner that will be described subsequently in order to provide the burner proper 22. Such burner proper has operatively associated therewith an assembly of sheet metal work establishing plural air supply chambers 26 and an air supply manifold or windbox 28 for supplying air under pressure to the chambers 26.

Figure 5:
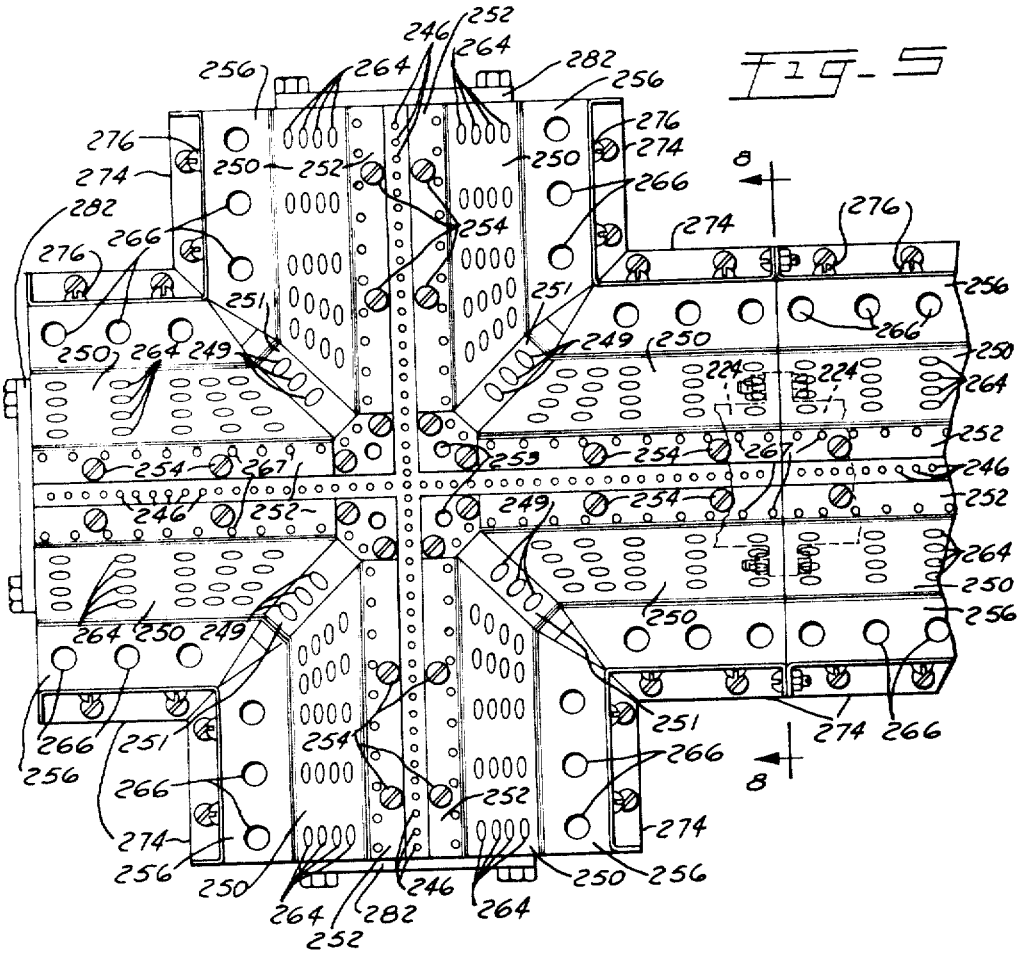
FIG. 5 is a front elevational view similar to FIG. 3 but illustrating a cross-type burner section and its manner of connection to a straight-line burner section.

The burner 20 is made up of line burner units that are capable of being variously formed into patterns which will accommodate different cross sectional areas of air streams. The particular pattern that is illustrated herein for exemplary purposes in FIG. 1 is made up of straight-line sections, the pattern being distributed transversely across the interior of the duct 21. Other shapes of line burner units are contemplated for various burners, as, for example, the cross shape that is illustrated in FIG. 5 and a T shape which has not been specifically shown herein but the nature of which may readily be ascertained by eliminating one of the legs of a cross-shaped burner. The exemplary burner of FIG. 1 comprises four straight-line units, each unit being designated by the reference numeral 30 and including one of the burner castings 24, together with the aforementioned sheet metal work.

Figure 10:
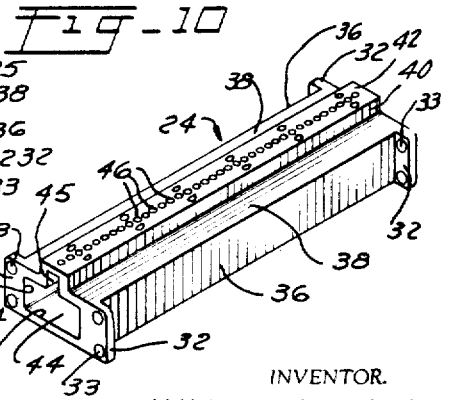
FIG. 10 is a perspective view similar to FIG. 9 but showing the burner casting for a straight-line burner section, the casting being devoid of sheet metal counterparts.
Figure 12:
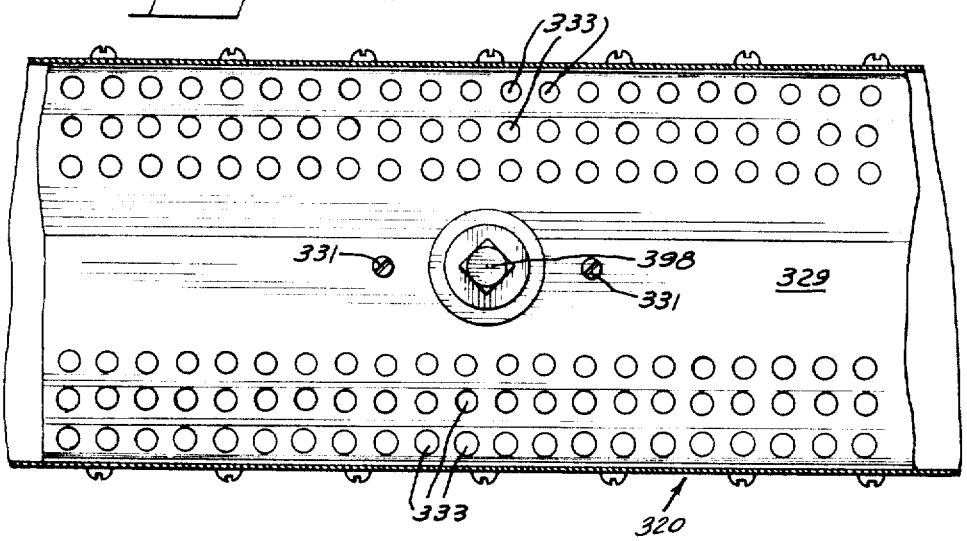
FIG. 12 is a sectional view taken on the line 12—12 of FIG. 11.
Figure 11:
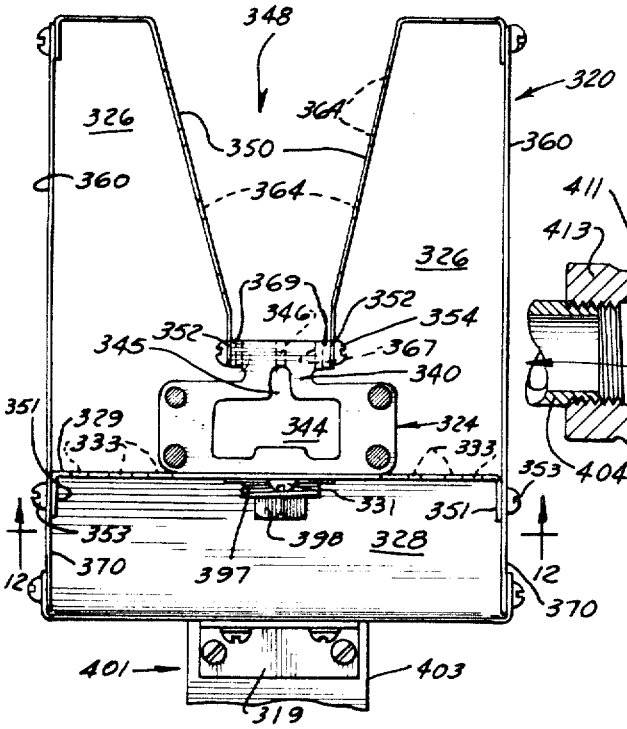
FIG. 11 is a sectional view similar to FIG. 2 but showing a slightly modified form of sectional burner of the straight-line type.

Referring now to FIGS. 1 to 4, inclusive, and FIG. 10, each burner casting 24 is of elongated hollow design and is generally rectangular in transverse or cross section. Each casting 24 is open-ended and at its open ends it is provided with lateral attachment flanges 32 having bolt holes 33 therein by means of which adjacent castings 24 may be secured together in end-to-end relationship so that the interiors thereof communicate.

Although in FIG. 1, as in most normal burner installations, the line burner units rest or are placed on their sides so that the front of the burner extends in the direction of flow of the air stream and on the downstream side thereof, in FIG. 2, the burner unit is shown as facing upwardly, and in the following description as well as in the appended claims reference to the burner unit as a detached unit apart from the air stream in which it is mounted will be made on the basis of such orientation.

Figure 2:
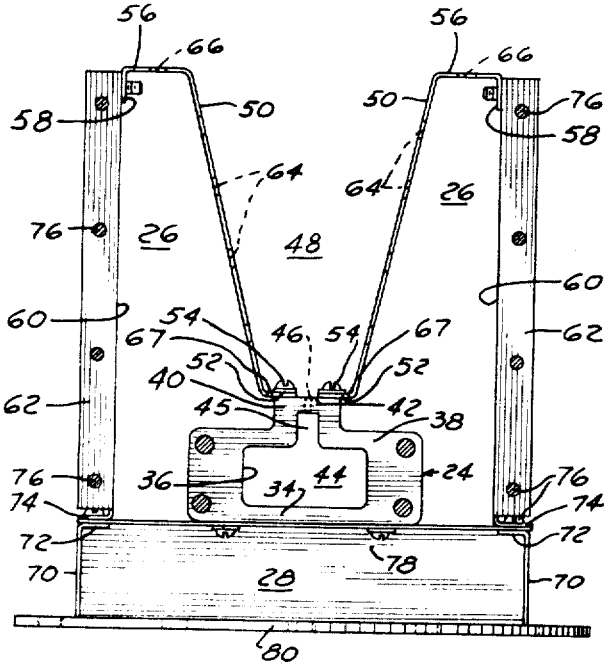
FIG. 2 is a transverse sectional view of one of the sections of units of the burner of FIG. 1.
Figure 3:
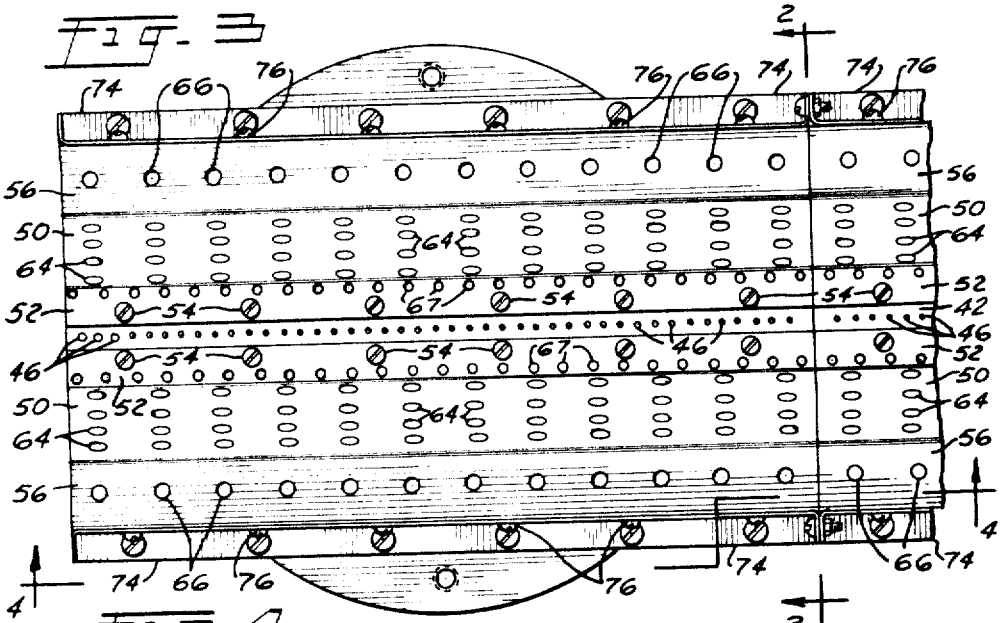
FIG. 3 is a front elevational view of a complete straight-line burner section, illustrating in detail the manner in which it is joined to an adjacent similar section.
Figure 4:
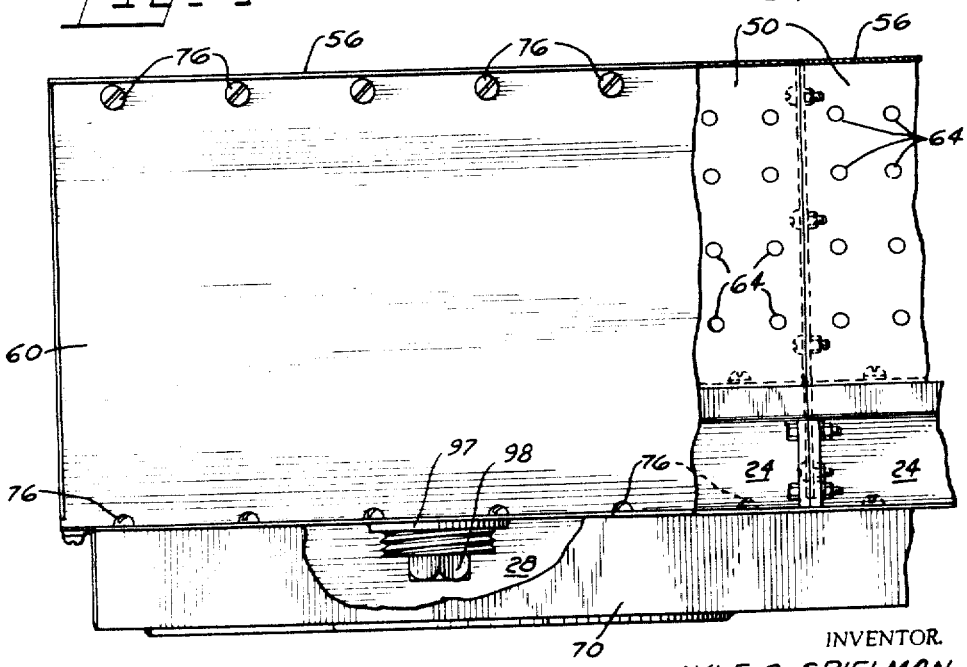
FIG. 4 is a longitudinal sectional view taken on the line 4—4 of FIG. 3.

As viewed in FIGS 2 and 10, each burner casting 24 includes a bottom wall 34, a pair of spaced apart side walls 36 and a top wall 38. The top wall 38 of each casting is provided with a raised rib 40 having a front burner face 42. The interior of the casting presents a straight longitudinally extending passageway 44 of rectangular design and an upward longitudinally extending extension 45 leading to the burner face 42. Each burner face 42 is provided with a plurality of relatively small, closely spaced, upwardly extending burner ports 46 which are arranged in a longitudinal row along the casting 24 as best seen in FIGS. 3 and 10. These gas ports 46 lead to, and communicate with, a V-shaped combustion space 48 which is defined by the sheet metal work that is associated with each line burner unit 30 in a manner that will be described presently.

The sheet metal work that is associated with each line burner unit 30 is in the form of a burner shroud and is of a composite nature. The air supply chambers 26 on opposite sides of each burner casting 24 are defined by inside obliquely extending or upwardly and outwardly inclined flame-confining walls 50 having an inclined angle of approximately 30°, the lower margins of which are bent or turned laterally inwards to provide attachment flanges 52. The latter rest on the associated face 42 and are secured in place by bolts 54 which extend into tapped holes in said burner face 42 and serve fixedly to secure the flanges 52 to this face along the longitudinal edges thereof as clearly shown in FIG. 2. The attachment flanges 52 overhang the burner face 42. The upper edges of the upwardly and outwardly inclined sheet metal walls 50 are bent or turned laterally outwards in order to provide top walls 56 which extend horizontally and have along the outer side margins thereof integral downturned attachment flanges 58 by means of which the top walls may be secured to the upper margins of outer rectangular side walls 60. The outer side walls 60 in turn have at the end margins thereof outwardly turned, outwardly extending attachment flanges 62 by means of which adjacent side walls in a series of line burner units 30 may be secured to each other.

The inclined, upwardly divergent flame-confining walls 50 of the air supply chambers 26 are formed with horizontal series or rows of air discharge openings 64 therethrough, such openings being distributed over the entire areas of the walls 50 and serving to establish communication between the interiors of the chambers 26 and the combustion spaces or troughs 48 at regions both close to the burner ports 46 in the burner faces 42 and at regions remote therefrom. Similar openings 66 are provided in the top walls 56 of the air chambers 26 and serve purposes that will be made clear when the operation of the burner 20 as a whole is set forth. Additional openings 67 are formed in the overhanging portions of the attachment flanges 52 and serve a function that will become clear presently. The combined area of the openings 67 is preferably between 3% and 10% of the combined area of the openings 64.

The air supply chambers 26 for each line burner unit 30 are in reality open-ended air supply spaces but when a series of the units 30 are connected together in end-to-end relationship, as shown in FIG. 1, the open ends of the series are closed by sheet metal plates 68 which are secured to the attachment flanges 62, thus establishing the two air supply chambers 26 on opposite sides of the burner proper 22. The air supply chambers 26 are separated from each other by the opposed inside upwardly and outwardly inclined walls 50 and by the burner proper 22 itself. The lower ends of the two chambers 26 communicate in common with the interior of the windbox 28 as shown in FIGS. 1 and 2. While individual windbox sections may be provided for each line burner unit 30, in the interests of economy and to reduce the required amount of sheet metal work, the windbox 28 is constructed so that it is common to all of the air supply spaces that cooperate to make up the air supply chambers 26 and it underlies all of the burner castings 24. The windbox 28 includes upwardly extending side walls 70 having laterally and inwardly turned attachment flanges 72 which mate with similar laterally and outwardly turned attachment flanges 74 on the lower margins of the side walls 60. Sheet metal screws 76 are employed wherever a union is made between adjacent sheet metal parts, these screws being variously shown in the drawings where required. End plates 78 at the ends of the burner 20 close the ends of the windbox 28. The bottom of the windbox is in the form of a rectangular metal plate 80 which is fixedly secured to one or more upstanding supports 81 by means of which the burner 20 as a whole is fixedly supported in the duct 21 and in the air stream.

Figure 6:
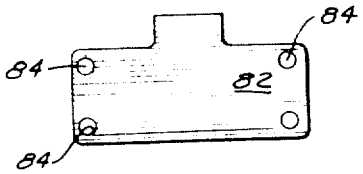
FIG. 6 is a plan view of an end closure plate which is employed in connection with the improved burner.

Returning now to the exemplary line burner 20 of FIG. 1, the composite gas passageway 44 of the sectional burner proper 22 is supplied with fuel gas under pressure from one open end thereof and the other open end is normally closed by a closure plate such as has been shown at 81 in FIG. 6. This closure plate 82 is flat and has an outline which conforms to the over-all cross sectional configuration of the associated burner casting 24 in the flanged end region thereof. The plate 82 is provided with bolt holes 84 which register with the bolt holes [34] *33* in the adjacent flange 32. Nut and bolt assemblies [86] (*not shown*) secure the end plate 82 to said adjacent flange 32, the end plate closing the adjacent end of the composite gas passageway 44. The other end of said composite gas passageway 44 is provided with an end plate 88 (see FIG. 7) which is similar to the closure plate 82 except for the fact that it has a threaded opening 90 therein for reception therein of the discharge end of a pipe section 92. The latter is associated with and forms a part of a gas supply line 94 as shown in FIG. 1. A control valve 96 is disposed in the line 94 for regulating the quantity of fuel gas which is fed or supplied under pressure to the composite gas passageway 44 in the burner proper 22 of the burner 20.

In certain installations, it may be found desirable to supply the passageway 44 with gas through the bottom wall 34 of one of the burner castings 24 instead of through the end of the passageway. Accordingly, the various burner bodies 24 are formed with relatively large threaded openings 97 (see FIG. 4) in the bottom walls 34 thereof and these openings, when not employed for gas admission purposes, may be closed by threaded plugs 98.

Referring again to FIG. 1, fresh air containing a normal complement of oxygen is supplied under pressure to the interior of the windbox 28 by way of a separate air conduit 100 which is connected to and communicates with the discharge side of a blower 101 on the exterior of the air stream duct 21. The discharge end of the conduit 100 communicates with the interior of the windbox through an opening 102 in the bottom plate 80 of the windbox, preferably in the medial or central region of the plate. A damper 103 may be provided for regulating the supply of air from the blower.

Means are provided whereby a small quantity of air under pressure issuing from the blower 101 may be bled from the conduit 100 to the gas line 94 for admixture with the incoming fuel gas under pressure entering the composite gas passageway 44 through the pipe section 92 in order to support combustion at extreme burner turndown as will be described subsequently. Such means comprises a by-pass air conduit 104 which connects the main air conduit 100 to the line 94 immediately ahead of the pipe section 92. A manually adjustable spring-biased check valve 106 capable of being throttled to completion is interposed in this by-pass air conduit 104 and serves automatically to close said conduit when the supply of gas under control of the valve 96 is increased above a certain point. Under low fire conditions, the pressure of the gas in the gas line 94 is such that the pressure of air in the conduit 100 appreciably exceeds the pressure of the gas in the gas line 94, and in such an instance, the check valve 106 allows a small amount of air to be bled from the conduit 100, through the by-pass air conduit 104, to the gas line 94 to sustain combustion so that the flame line will be continuous and have no blank spots. When the supply of gas is turned up to such a point that there is no longer danger of flame extinguishment, the check valve 106 will close automatically and this supply of blower air to the gas line 94 will be discontinued while, at the same time, reverse flow of gas in the by-pass conduit 104 is prevented.

The burner of FIG. 1 may operate in any desired position and, consequently, it may face upwardly as shown in FIG. 2 or it may face horizontally or sidewise as shown in FIG. 1 when positioned in an air stream, the air will approach the burner 20 from the back side thereof and the open mouth of the generally V-shaped combustion space or trough 48 will face downstream in the direction of air flow. In the operation of the air stream line burner 20 thus positioned in an air stream, under conditions of extreme burner turndown where a minimum amount of fuel gas is admitted through the control valve 96, the gas issuing from the burner ports 46 may be drawn outwardly in the combustion space or trough 48 by a modified venturi action, but there is likelihood that before this gas encounters the closest air openings 64 in the series or rows of openings in the inclined walls 50, there will be insufficient oxygen for combustion. For this reason, both the small air openings 67 and the air by-pass 104 are provided and the small quantity of air supplied from the two sources will maintain combustion in the immediate vicinity of the burner [port] *ports* 46. The flame is thus confined principally to the orifice region of the burner at the base of the combustion space where a thin line of the flame may be observed. Under high fire conditions, these air openings 67 supply sufficient air at the base of the combustion trough 48 to prevent blowing of the flame away from the burner ports 46 and combustion will take place throughout the entire trough volume.

As the amount of fuel gas issuing through the line 94 from the control valve 96 is gradually increased, the flame will travel forwardly or outwardly in the combustion space or trough 48 where it will encounter a progressively increasing number of the air openings 64 and progressively increasing turbulence will be maintained in said combustion space or trough. The large number of openings 64 and the size thereof are such that there will always be [an excess of] *sufficient* air [necessary to attain stoichiometric conditions of] *to maintain good or clean* combustion, even when maximum fuel gas is supplied to the composite gas passageway 44 in the burner castings. However, should for any reason any unburned fuel gas escape forwardly from the combustion space or trough 48, the air which issues from the air openings 66 in the top walls 56 will combine with this unburned gas to assure complete combustion thereof outside of the combustion space or trough 48. From the above description, it will be apparent that the velocity of the air stream has no appreciable effect on the character of the flame produced by the present burner and that the burner will operate at any air stream velocity whatsoever regardless of the oxygen content of the stream. The burner will operate in a stream having no oxygen content or in an air stream at [zero] *extremely* low velocity.

Figure 8:
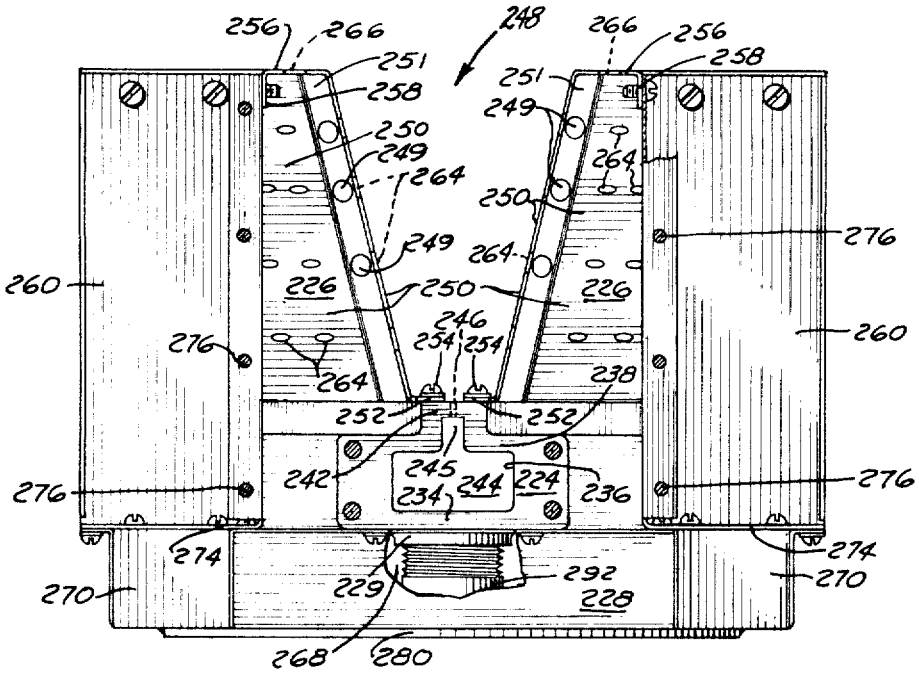
FIG. 8 is a sectional view taken substantially along the line 8—8 of FIG. 5.
Figure 9:
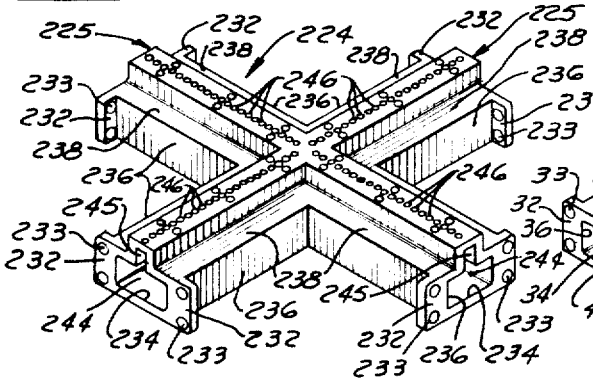
FIG. 9 is a perspective view of the burner casting of a cross-type burner section or unit, showing the same devoid of sheet metal counterparts.

In FIGS. 5, 8 and 9, the elements of a cross-shaped burner constructed according to the present invention have been shown. Such a burner is similar in many respects to the previously described straight-line type of burner and, therefore, in order to avoid needless repetition of description herein, similar characters of reference but of a higher order have been applied to the corresponding parts as between the straight-line burner unit 20 as it is illustrated in FIGS. 1, 2 and 3 and the cross-shaped burner 220 as it is illustrated in FIG. 5, for example.

The burner 220 is predicated upon or involves the use of a burner casting 224 which is generally in the form of a cross having four diverging legs 225 and in which adjacent legs extend at an angle of 90° to each other. The cross sectional shape of the legs 225 is the same as the cross sectional shape of the burner castings 24 of the burner 20 and the outer end of each leg there are provided attachment flanges 232 whereby the leg may be secured to the adjacent leg of a similar cross-shaped burner casting 224 or to one end of a straight-line burner casting 24. In FIG. 5, closure plates 282 close the outer end of three of the legs 225 while the fourth leg is shown as being operatively connected to one end of a straight-line burner casting 24.

Figure 7:
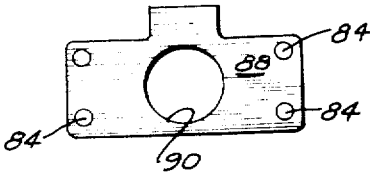
FIG. 7 is a plan view of a gas admission fitting which is employed in connection with the invention.

Gas may be supplied to the intersecting passageways 244 within the burner casting 224 through any one of the legs 225, either by the use of an end 88 of FIG. 7 or by intercommunication with an adjacent burner casting 24 or 224, as the case may be. However, especially where a cross-shaped burner 220 assumes a generally central position in any given assembly or installation, it is preferable that the fuel gas under pressure be supplied to the casting 224 through a threaded opening 229 which is formed centrally in the bottom wall 234 of the casting at the region of passageway intersection within the casting. A separate pipe section, such as the section shown at 292, may be threadedly received in the opening 229 and this pipe section may pass through the bottom wall plate 280 of the windbox 228.

The various sections of the sheet metal work which is associated with the burner casting 224 are tailored to fit the casting. Thus, angular inside walls 250 which accommodate adjacent legs 225 are employed and have their attachment flanges 252 secured to the burner face 242. Similarly, angular outside walls 260 accommodate adjacent legs 225. The inside walls 250 also afford the top walls 256.

It is to be noted that the angular or inclined inside walls 250 are provided with medial sections 251 which converge inwardly or downwardly into the cross-shaped combustion space 248 and that these medial sections are provided with additional air openings 249 similar to the air openings 264. A series of four relatively large openings 253 are formed in the attachment flanges 252 just outside the inner corners of the casting 224. These openings 249 and 253 are essential to accommodate the gas which issues from the burner ports 246 in the central region of the burner casting 224.

The windbox 228 is appropriately of cross shape or configuration and it completely underlies the burner casting 224. In instances where one of the burner castings 224 is to be fed with gas through the distal or outer end of one of the legs 225, the threaded opening 229 in the bottom wall 234 of the burner casting may be closed by a conventional pipe plug (not shown).

The above described burner presents great versatility of operation and, in general, four basic types of operation are available. At extremely low fire conditions, the burner may be supplied with raw gas and the blower maintained out of operation. Ambient air in the vicinity of the burner ports 46 is relied upon for combustion as the raw gas issues from the ports. Under such conditions, a turndown ratio of approximately 20 to 1 is possible. The burner may also be operated on raw gas at a turndown ratio of approximately 30 to 1 by maintaining [low] blower operation and allowing air to be fed through the by-pass conduit 104 to the gas supply line 96. By throttling the gas and air which is fed to the burner conjointly, utilizing the valve 96 and damper 103, a turndown ratio of approximately 45 to 1 is made possible. Finally, by thus throttling the gas and air and also utilizing the by-pass conduit 104, turndown ratios in excess of 60 to 1 may be attained.

In FIGS. 11 to 15, inclusive, a further modified form of air heating burner 320 has been illustrated fragmentarily. In view of the similarity between the previously described burner 20 of FIGS. 1 to 4, inclusive, and this modified form of burner, and in order to avoid needless repetition of description, similar reference numerals but of a higher order [,] are applied to the corresponding parts as between the respective disclosures.

Whereas in the form of the invention shown in FIG. 2, the openings 67 which establish communication between the air supply chambers 26 and the V-shaped combustion space 48 near the narrow base of said space extend through the sheet metal attachment flanges 52, in the modified form of burner of FIGS. 11 to 15, inclusive, the attachment flanges 52 have been omitted and the openings 367 (see FIG. 11) are provided in portions of the casting 324 which constitutes the burner body. Accordingly, the raised rib 340 is generally T-shape in cross section and the openings 367 are formed in the lateral side legs or flanges 369 of such rib. The inclined flame-confining walls 350 which define the combustion space 348 are provided with attachment flanges 352 near the base of said combustion space and attachment screws 354 serve to secure these flanges to the outer edges or side surfaces of the side legs 369 of the T-shaped rib 340.

The windbox 328, instead of being formed as a separate unit, is defined by side walls 370 which are, in effect, extensions of the side walls 360 of the air supply chambers 326. The windbox 328 is separated from the air supply chambers 326 by means of an air metering and distribution plate 329 which constitutes a support for the casting 224 and is secured to the casting by screws 331. A series of widely distributed, closely spaced holes 333 are formed in the air distribution plate 329 on opposite sides of the casting 324, such holes serving to distribute air from the windbox 328 evenly throughout the air supply chambers 326 so that the pressure within these chambers is equalized. Such even distribution of air to the interior of the air supply chambers 326 is essential to proper burner operation since it insures equal air distribution to the V-shaped combustion space 348 through the openings 364 in the inclined walls 350. The longitudinal side edges of the air metering and distribution plate 329 are bent laterally to provide attachment flanges 351 which are secured by screws 353 to the outer side walls 360 of the burner 320.

One outer side wall 360 of the burner 320 is provided therein with a relatively large opening 361 whereby air may be drawn off from the associated air supply chamber 326 for introduction to the gas supply conduit leading to the burner casting 324 in a manner that will be described presently and for a purpose similar to that described in connection with the burner 20 wherein the by-pass conduit 104 permits the bleeding of air from the air supply conduit 100 (see FIG. 1) to the gas supply conduit 94 during the low fire conditions of the burner 20.

The burner 320 is particularly well-adapted for use in single pass duct systems wherein there is no recirculation of air and the blower that supplies air to the burner casting is the sole source of combustion air. Such a system has been shown in FIGS. 13, 14 and 15.

Figure 13:
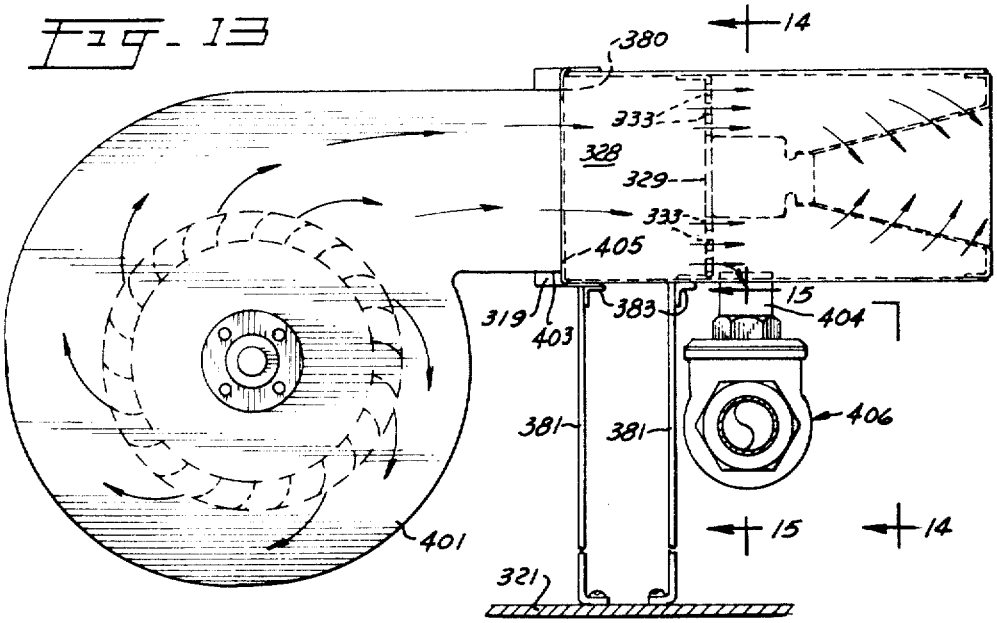
FIG. 13 is a side elevational view of the burner of FIGS. 11 and 12, such view showing the burner operatively installed in an air stream and also showing the motor-driven blower therefor for the burner disposed in the air stream.
Figure 14:
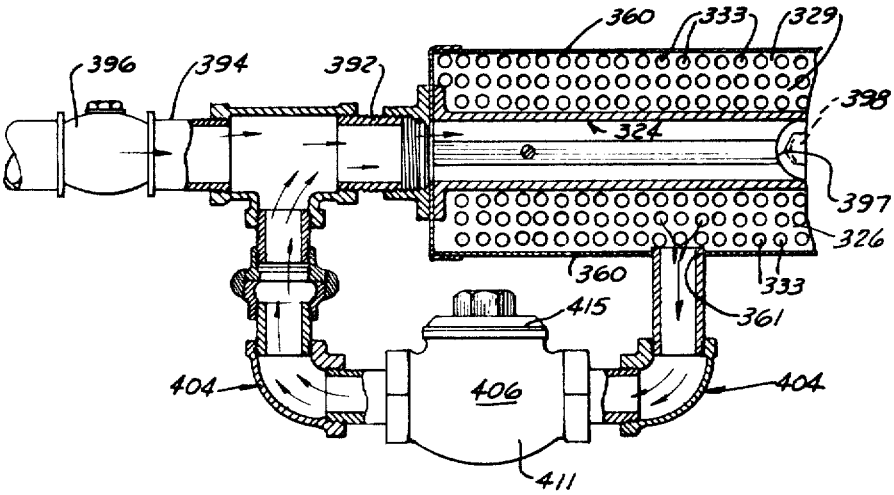
FIG. 14 is a sectional view taken substantially along the line 14—14 of FIG. 13.

The windbox 328 and, consequently, the air supply chambers 326, is supplied with air from a motor-driven blower 401, and both the burner 320 and the blower 401 are disposed within a duct 321 which is partially and diagrammatically illustrated in FIG. 13. The air stream within the duct 321 is a single pass air stream, which is to say, that it is not recirculated as is the case with the air stream within the duct 21 that is shown in FIG. 1 and such air stream may be impelled or created either by a suction blower (not shown) which is downstream from the burner *or* [of] a pressure blower which is upstream from the *burner* [blower]. In either event, the operation of the burner remains the same.

The outlet side 403 of the blower 401 is connected directly to the windbox 328, is secured thereto by a bracket 319 and communicates therewith through a relatively large opening 405 in the rear wall 380 of the windbox. The windbox 328 may be supported within the duct 321 in any suitable manner. If desired, it may be supported from the bottom wall of the duct 321 by vertical supports 381 which are secured to the windbox by brackets 383.

A by-pass conduit 404 which corresponds in function to the by-pass conduit 104 that is associated with the burner 20 of FIG. 1 establishes communication between the interior of one of the air supply chambers 326 and the composite gas line 394 which supplies gas to the burner passageway [34] *344*. A gravity-biased check valve 406 is interposed in the gas line 394 and is adapted automatically to move or swing into an open position to admit air from the associated air supply chamber 326 to the gas line 394 when the pressure of air in said chamber exceeds the gas pressure in the line 394 by a predetermined amount. The check valve 406 thus functions in the manner of the check valve 106 to maintain combustion under conditions of low fire.

Figure 15:
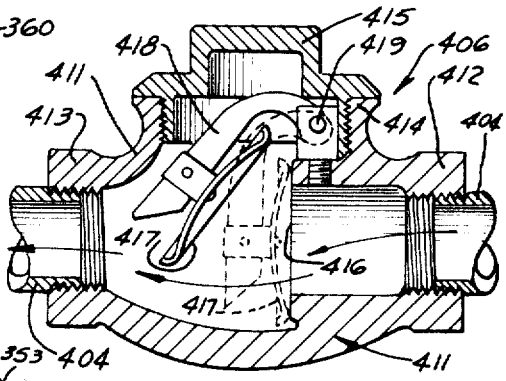
FIG. 15 is an enlarged sectional view taken on the line 15—15 of FIG. 13.

The gravity-actuated check valve 406 is shown in detail in FIG. 15 and includes a valve casing 411 which is generally in the form of a T and has an inlet leg 412, an outlet leg 413, and a functional access leg 414. The last-mentioned leg is normally closed by a threaded plug 415 which upon removal provides access to the interior of the valve casing 411. The inlet leg 412 of the valve casing provides an inlet port 416 which is normally closed by a weighted valve element 417. The latter is carried on an arm 418 which is pivoted as at 419 within the casing 411 in order that the valve element in response to pressure vibrations is movable back and forth between the open position wherein it is shown in full lines in FIG. 15 and the dotted line closed position wherein it closes the port 416.

The invention is not to be limited to the exact arrangement of parts shown in the accompanying drawings or described in this specification as various changes in the details of construction may be resorted to without departing from the spirit or scope of the invention. For example, while two forms of burner casting outlines have been illustrated herein, other forms of burner castings and tailored sheet metal counterpart structures therefor are contemplated. The invention contemplates the provision of burner castings which are of T-shape configuration and have three legs instead of four legs as is the case in connection with the casting 224. In such instance, the burner casting will assume the shape of one of the castings 224 with one of the legs removed and with the side wall of the casting at the region of removal being imperforate. The use of Y-castings also is contemplated. Therefore, only insofar as the invention has been particularly pointed out in the accompanying claims is the same to be limited.

This application is a continuation-in-part of my copending patent application Ser. No. 296,327, filed on July 19, 1963, and entitled "Air Heating Burner."

Having thus described the invention what I claim as new and desire to secure by Letters Patent is:

1. A gas mixing burner adapted for operation in an air stream flowing forwardly past the burner, said burner comprising a tubular burner body having a forward burner face directed downstream and provided with a multiplicity of spaced relatively small burner ports therein in communication with the interior of the body for producing a corresponding number of forwardly directed flame jets, flame-confining walls extending forwardly from said forward burner face and, in combination with said burner face, defining a forwardly opening combustion trough, means including said flame-confining walls defining a pair of closed air supply chambers on opposite sides of the combustion trough, said flame-confining walls being formed with a plurality of openings spaced both longitudinally and at different distances from said burner face, [means for supplying low pressure air to the interiors of said air supply chambers,] and means for regulably supplying fuel gas under pressure to the interior of said tubular burner body, *said air supply chambers being in communication with and adapted to receive air from a supply of air under such pressure as to cause air in the air supply chambers to flow through the openings in the flame-confining walls into said combustion trough.*

2. A gas mixing burner as set forth in claim 1 and wherein the air supply chambers are provided with forwardly facing narrow elongated longitudinally extending walls on opposite sides of the combustion trough and in close proximity to the forward edges of the flame-confining walls, said forwardly facing walls being formed with a plurality of longitudinally spaced openings therein and positioned to discharge air into the air stream in close proximity to the open mouth of the combustion trough.

3. A gas mixing burner as set forth in claim 1 and wherein [said means for supplying air to the interiors of] said air supply chambers [comprises] *communicate with the air supply by way of* a windbox common to and in open communication with the rear portions of said air supply chambers.

4. A gas mixing burner as set forth in claim 1 and wherein [said means for supplying air to the interiors of] said air supply chambers [comprises] *communicate with the air supply by way of* a forwardly opening shallow tray-like windbox common to and in open communication with the rear portions of said air supply chambers, *and* said burner body *is* disposed wholly within the confines established by said air supply chambers and windbox and [serving] *serves*, in part, to separate said air supply chambers from each other.

5. A gas mixing burner adapted for operation in an air stream flowing forwardly past the burner, said burner comprising a tubular burner body having a forward burner face directed downstream and provided with a multiplicity of spaced relatively small burner ports therein in communication with the interior of the body for producing a corresponding number of forwardly directed flame jets, a sectional sheet metal burner shroud encompassing said burner body and within which the burner body is wholly disposed, said shroud including flame-confining walls which extend forwardly from said forward burner face and, in combination with the latter, define a combustion trough the forward region of which opens into the air stream, narrow elongated longitudinally extending front walls at the forward open end of the combustion trough, side walls on opposite sides of the burner body, and end walls, said flame-confining walls, front walls, side and end walls establishing a pair of closed air supply chambers on opposite sides of the combustion trough, said flame-confining walls being formed with a plurality of openings spaced both longitudinally and at different distances from said burner face, said shroud further including a windbox rearwardly of the burner body and common to and in communication with the air supply chambers, [means for supplying low pressure air to the interior of said windbox,] and means for regulably supplying fuel gas under pressure to the interior of said tubular burner body, *said air supply chambers being in communication with and adapted to receive air from a supply of air under such pressure as to cause air in the air supply chambers to flow through the openings in the flame-confining walls into said combustion trough.*

6. A gas mixing burner as set forth in claim 5 and wherein said longitudinally extending front walls are formed with respective rows of openings therein.

7. A gas mixing burner adapted for operation in an air stream flowing forwardly past the burner, said burner comprising a tubular burner body having a forward burner face directed downstream and provided with a multiplicity of spaced relatively small burner ports therein in communication with the interior of the body for producing a corresponding number of forwardly directed flame jets, a sectional sheet metal burner shroud encompassing said burner body and within which the burner body is wholly disposed, said shroud including flame-confining walls which extend forwardly from said forward burner face and, in combination with the latter, define a combustion trough the forward region of which opens into the air stream, narrow elongated longitudinally extending front walls at the forward open end of the combustion trough and side walls on opposite sides of the burner body, said flame-confining walls, front walls and side walls establishing a pair of air supply chambers on opposite sides of the combustion trough, said flame-confining walls being formed with a plurality of openings spaced both longitudinally and at different distances from said burner face, said shroud further including a shallow forwardly opening tray-like windbox common to and in open communication with the rear portions of said air supply chambers, said burner body being disposed forwardly of the windbox and serving, in part, to separate said air supply chambers from each other, means for supplying air under [low] pressure to the interior of the windbox, and means for regulably supplying fuel gas under pressure to the interior of said burner body.

8. A gas mixing burner as set forth in claim 7 and wherein the burner body is provided with a rear wall having a gas inlet opening therein medially of its ends, and said means for supplying gas to the interior of the burner body includes a supply pipe in communication with said opening.

9. A gas mixing burner adapted for operation in an air stream flowing forwardly past the burner, said burner comprising a burner proper and a burner shroud, said burner proper being in the form of a hollow casting including tubular legs which diverge radially outwardly from one another in spider-like fashion and communicate internally at their inner ends, each of said legs having a forward burner face adapted to be directed downstream and provided with a row of longitudinally spaced small burner ports therein in communication with the interior of the leg, said burner shroud being in the form of a composite sheet metal structure presenting flame-confining walls extending obliquely forwardly and outwardly in divergent relation from said forward burner faces of the legs and, in combination with said faces, defining forwardly opening combustion troughs which intersect one another and the longitudinal axes of which diverge radially outwardly from one another so as to provide a composite combustion space in front of the burner proper, said flame-confining walls being provided with a plurality of openings spaced both longitudinally of the troughs and at different distances from the burner faces, means including said flame-confining walls defining air supply chambers which are nested between adjacent troughs so that each trough is straddled by a pair of the air supply chambers, [means for supplying low pressure air to the interior of said air supply chambers,] and means for regulably supplying fuel gas under pressure to the interior of said hollow casting, *said air supply chambers being in communication with and adapted to receive air from a supply of air under such pressure as to cause air in the air supply chambers to flow through the openings in the flame-confining walls into the combustion troughs.*

10. A gas mixing burner as set forth in claim 9 and wherein adjacent flame-confining walls are connected together by narrow medial wall sections which converge rearwardly into the composite combustion space.

11. A gas mixing burner as set forth in claim 9 and wherein adjacent flame-confining walls are connected together by narrow medial wall sections which converge rearwardly into the composite combustion space and are provided with a plurality of spaced openings therethrough.

12. A gas mixing burner adapted for operation in an air stream flowing forwardly past the burner, said burner comprising a tubular burner body having an elongated narrow forward burner face directed downstream and provided with a multiplicity of spaced relatively small burner ports therein in communication with the interior of the body for producing a corresponding number of forwardly directed flame jets, a sectional sheet metal burner shroud encompassing said burner body and within which the burner body is wholly disposed, said shroud including flame-confining walls which extend obliquely forwardly and outwardly in divergent relation from said burner face on opposite sides thereof, said walls being formed with lateral attachment flanges secured to the burner face and overhanging the same on opposite sides thereof, thus providing narrow elongated proximate walls in the vicinity of said burner ports, said proximate walls and said flame-confining walls, in combination with the burner face, defining a combustion trough the forward region of which opens into the air stream, narrow elongated longitudinally extending front walls at the forward open end of the combustion trough and side walls on opposite sides of the burner body, said proximate walls, flame-confining walls, front walls and side walls establishing a pair of air supply chambers on opposite sides of the combustion trough, said flame-confining walls being formed with a plurality of openings spaced both longitudinally and at different distances from said burner face, said shroud further including a shallow forwardly opening tray-like windbox common to and in open communication with the rear portions of said air supply chambers, said burner body being disposed forwardly of the windbox and serving, in part, to separate said air supply chambers from each other, [means for supplying air under low pressure to the interior of the windbox,] and means for regulably supplying fuel gas under pressure to the interior said burner body, *said windbox being in communication with and adapted to receive air from a supply of air under such pressure as to cause air in the air supply chambers to flow through the openings in the flame-confining walls into the combustion trough.*

13. A gas mixing burner as set forth in claim 12 and wherein the proximate walls are formed with respective rows of longitudinally spaced openings therein.

14. A gas mixing burner adapted for operation in an air stream flowing forwardly past the burner, said burner comprising a tubular burner body having a forward burner face provided with a multiplicity of spaced relatively small burner ports therein in communication with the interior of the burner body for producing a corresponding number of forwardly directed flame jets, flame-confining walls extending forwardly and obliquely outwardly in divergent relation from said forward burner face and, in combination with the latter, establishing a combustion trough the forward region of which opens into the air stream, means including said flame-confining walls and a portion of the burner body establishing a pair of air supply chambers on opposite sides of the burner body, said flame-confining walls being formed with a plurality of openings spaced both longitudinally and at different distances from said burner face, said openings establishing communication between said air spaces and the combustion trough, a fuel gas supply conduit in communication with the interior of the burner body, a control valve for regulably supplying fuel gas to said supply conduit, an air duct leading to said air chambers, means for regulably supplying air to said duct, a by-pass conduit extending between the air duct and fuel gas supply conduit for bleeding small quantities of air from the air supply duct to the fuel gas supply conduit, and a check valve in said by-pass conduit for preventing passage of fuel gas from the fuel gas supply conduit to the air duct when the pressure of gas in the fuel gas supply conduit exceeds the pressure of air in said air duct.

15. A gas mixing burner as set forth in claim 14 and wherein said obliquely and outwardly extending flame-confining walls present an included angle of approximately 30°.

16. A gas mixing burner adapted for operation in an air stream flowing forwardly past the burner, said burner comprising a tubular burner body having a forward burner face directed downstream and provided with a multiplicity of spaced relatively small burner ports therein in communication with the interior of the body for producing a corresponding number of forwardly directed flame jets, flame-confining walls extending obliquely forwardly and outwardly in divergent relation from said forward burner face and, in combination with said burner face, defining a forwardly opening combustion trough, the proximate edges of said flame-confining walls extending laterally inwardly toward each other, thus providing lateral flanges which overhang the lateral edges of the forward burner face, means including said flame-confining walls defining a pair of closed air supply chambers on opposite sides of the combustion trough, said flame-confining walls being formed with a plurality of openings spaced both longitudinally and at different distances from said burner face, [means for supplying low pressure air to the interiors of said air supply chambers,] said lateral flanges being formed with a plurality of relatively small openings therethrough establishing communication between the air supply chambers and combustion trough at the base region of the latter, and means for regulably supplying fuel gas under pressure to the interior of said tubular burner body, *said air supply chambers being in communication with and adapted to receive air from a supply of air under such pressure as to cause air in the air supply chambers to flow through the openings in the flame-confining walls into the combustion trough.*

17. A gas mixing burner adapted for operation in an air stream flowing forwardly past the burner, said burner comprising a tubular burner body having a forward burner face directed downstream and provided with a multiplicity of spaced relatively small burner ports therein in communication with the interior of the body for producing a corresponding number of forwardly directed flame jets, a sectional sheet metal burner shroud encompassing said burner body and within which the burned body is wholly disposed, said shroud including flame-confining walls which extend obliquely forwardly and outwardly in divergent relation from said forward burner face and, in combination with the latter, define a combustion trough the forward region of which opens into the air stream, narrow elongated longitudinally extending front walls at the forward open end of the combustion trough, side walls on opposite sides of the burner body, end walls, and rear walls extending between said side walls and the burner body, said flame-confining walls, front walls, side walls, end walls and rear walls establishing a pair of closed air supply chambers on opposite sides of the combustion trough, said flame-confining walls being formed with a plurality of openings spaced both longitudinally and at different distances from said burner face, [said rear walls being provided with a series of widely distributed closely spaced holes therein through which air under low pressure is adapted to be distributed to the interior of said air supply chambers,] and means for regulably supplying fuel gas under pressure to the interior of said tubular burner body, *said rear walls being provided with a series of widely distributed closely spaced air inlet holes and having the upstream sides thereof in communication with a supply of air under such pressure as to cause the air that flows into the air supply chambers via said air inlet holes to flow through the openings in the flame-confining walls into said combustion trough.*

18. A gas mixing burner adapted for operation in an air stream flowing forwardly past the burner, said burner comprising a tubular burner body having a forward burner face directed downstream and provided with a multiplicity of spaced relatively small burner ports therein in communication with the interior of the body for producing a corresponding number of forwardly directed flame jets, a sectional sheet metal burner shroud encompassing said burner body and within which the burner body is wholly disposed, said shroud including flame-confining walls which extend obliquely forwardly and outwardly in divergent relation from said forward burner face and, in combination with the latter, define a combustion trough the forward region of which opens into the air stream, narrow elongated longitudinally extending front walls at the forward open end of the combustion trough and side walls on opposite sides of the burner body, said flame-confining walls, front walls and side walls establishing a pair of air supply chambers on opposite sides of the combustion trough, said flame-confining walls being formed with a plurality of openings spaced both longitudinally and at different distances from said burner face, said shroud further including a shallow forwardly opening tray-like windbox common to and in open communication with the rear portions of said air supply chambers, said burner body being disposed forwardly of the windbox and serving, in part, to separate said air supply chambers from each other, an air distribution plate separating each of said air supply chambers from the windbox and provided with a series of widely distributed closely spaced holes therein and through which holes communication between the windbox and air supply chambers is established, [means for supplying air under low pressure to the interior of the windbox,] and means for regulably supplying fuel gas under pressure to the interior of said burner body, *said windbox being in communication with and adapted to receive air from a supply of air under such pressure as to cause air in the air supply chambers to flow through the openings in the flame-confining walls into said combustion trough.*

19. A gas mixing burner adapted for operation in an air stream flowing forwardly past the burner, said burner comprising an elongated tubular body adapted to extend transversely of the air stream and provided with an exterior longitudinally extending raised rib adapted to project in a downstream direction, said rib being generally T-shape in cross section and including a radial stem portion and lateral side leg portions, the outer faces of said side leg portions presenting a forward burner face, there being a longitudinally extending row of closely spaced burner ports in said burner body opening onto said burner face and communicating with the interior of the body through said radial stem portion for producing a corresponding number of flame jets, flame-confining walls extending obliquely forwardly and outwardly in divergent relation from the end regions of said side legs and, in combination with said burner face, defining a forwardly opening combustion trough, means including said flame-confining walls [defining a pair of closed air supply chambers on opposite sides of the combustion trough, said flame-confining walls] defining a pair of closed air supply chambers on opposite sides of the combustion trough, said flame-confining walls being formed with a plurality of openings spaced both longitudinally and at different distances from said burner face, [means for supplying low pressure air to the interiors of said air supply chambers,] said side [legs] *leg portions* each being formed with a longitudinal row of relatively small openings therethrough for establishing communication between [the ambient atmosphere and] said air supply chambers *and combustion trough,* and means for regulably supplying fuel gas under pressure to the interior of said tubular burner body, *said air supply chambers being in communication with and adapted to receive air from a supply of air under such pressure as to cause air in the air supply chambers to flow through the openings in the flame-confining walls into said combustion trough.*

20. A gas mixing burner as set forth in claim 17 and wherein said burner body is disposed forwardly of said rear walls, and wherein each of said air supply chambers is defined by one of said flame-confining walls, one of said front walls, one of said side walls, one of said rear walls, and one side face of the burner body.

References Cited

The following references, cited by the Examiner, are of record in the patented file of this patent or the original patent.

UNITED STATES PATENTS

| | | | |
|---|---|---|---|
| 2,538,953 | 1/1951 | Yates et al. | 263—19 |
| 3,044,754 | 7/1962 | Skeroske et al. | 263—19 |
| 3,051,464 | 8/1962 | Yeo et al. | 263—19 |
| 3,178,161 | 5/1965 | Yeo et al. | 263—19 |
| 3,186,697 | 6/1965 | Haedike et al. | 263—19 |

FREDERICK L. MATTESON, Jr., *Primary Examiner.*

J. J. CAMBY, *Assistant Examiner.*